(12) United States Patent
Ban et al.

(10) Patent No.: US 8,098,928 B2
(45) Date of Patent: Jan. 17, 2012

(54) APPARATUS FOR PICKING UP OBJECTS

(75) Inventors: Kazunori Ban, Yamanashi (JP); Ichiro Kanno, Yamanashi (JP); Hidetoshi Kumiya, Yamanashi (JP); Shouta Takizawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 964 days.

(21) Appl. No.: 12/057,423

(22) Filed: Mar. 28, 2008

(65) Prior Publication Data

US 2008/0240511 A1 Oct. 2, 2008

(30) Foreign Application Priority Data

Mar. 30, 2007 (JP) ................................. 2007-091730

(51) Int. Cl.
*G06K 9/00* (2006.01)
(52) U.S. Cl. ........ 382/153; 382/288; 382/168; 382/203; 382/272; 382/152; 700/1; 700/83; 700/90; 700/275; 700/259
(58) Field of Classification Search .................. 382/153, 382/288, 168, 203, 272, 152; 700/1, 83, 700/90, 275, 259
See application file for complete search history.

(56) References Cited

U.S. PATENT DOCUMENTS

| | | | | |
|---|---|---|---|---|
| 4,920,572 A | * | 4/1990 | Sugita et al. | 382/152 |
| 5,446,835 A | * | 8/1995 | Iida et al. | 700/259 |
| 2005/0265605 A1 | | 12/2005 | Nakamoto et al. | |

FOREIGN PATENT DOCUMENTS

| | | |
|---|---|---|
| JP | 2110788 | 4/1990 |
| JP | 7019813 | 1/1995 |
| JP | 8226961 A | 9/1996 |
| JP | 9255158 | 9/1997 |
| JP | 10118975 | 5/1998 |
| JP | 10-315167 A | 12/1998 |
| JP | 3252941 B | 2/2002 |
| JP | 2005-001022 A | 1/2005 |
| JP | 2005122492 A | 5/2005 |
| JP | 2005141720 | 6/2005 |

OTHER PUBLICATIONS

Atsushi Watanabe et al., "Practical Bin Picking by the Intelligent Robot," ISR 2005, Nov. 29-Dec. 1, 2005.
Notice of Reasons for Rejection for JP2007-091730 mailed Mar. 3, 2009.
Notice of Reasons for Rejection for JP 2007-091730 mailed Jul. 8, 2008.

* cited by examiner

*Primary Examiner* — Mike Rahmjoo
(74) *Attorney, Agent, or Firm* — Lowe Hauptman Ham & Berner LLP

(57) ABSTRACT

An apparatus for picking up objects including a robot for picking up an object, at least one part of the object having a curved shape, having a storing means for storing a gray gradient distribution model of the object, a recognizing means for recognizing a gray image of the object, a gradient extracting means for extracting a gray gradient distribution from the gray image recognized by the recognizing means, an object detecting means for detecting a position or position posture of the object in the gray image in accordance with the gray gradient distribution extracted by the gradient extracting means and the gray gradient distribution model stored by the storing means, a detection information converting means for converting information of the position or position posture detected by the object detecting means into information of position or position posture in a coordinate system regarding the robot; and a robot moving means for moving the robot to the position or position posture converted by the detection information converting means to pick up the object. Thus, the object having a curved shape can be detected and picked up in a reasonably short period of time.

7 Claims, 12 Drawing Sheets

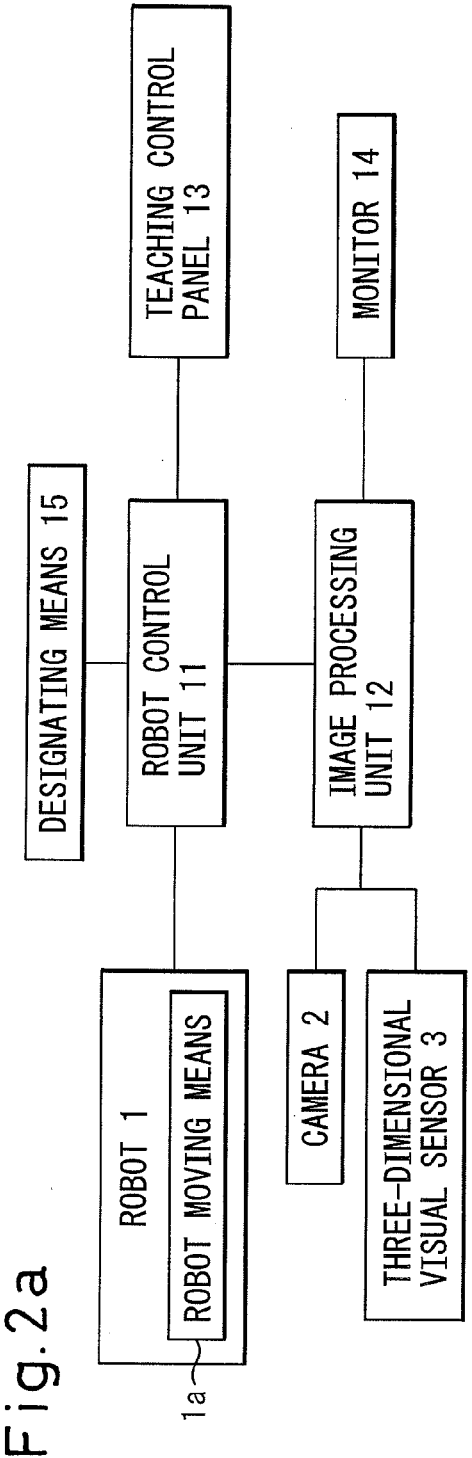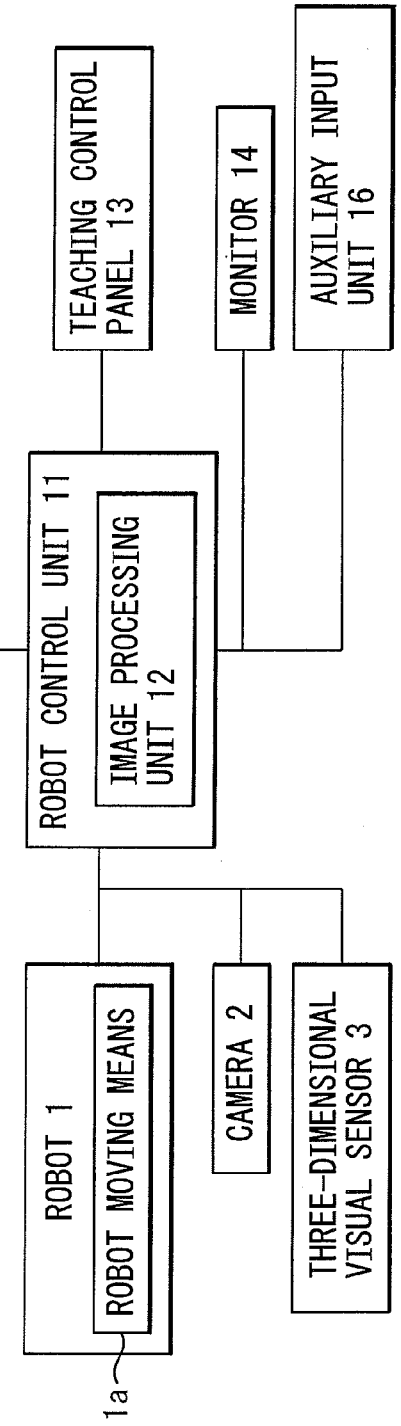

Fig.6
GRAY GRADIENT PATTERN
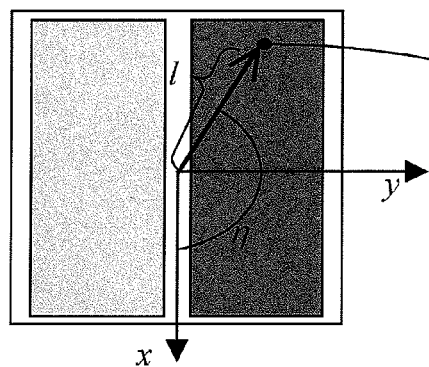
Log-Polar MAPPING PATTERN
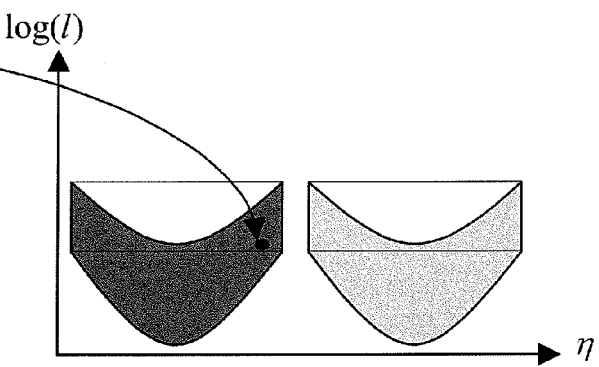

IMAGE 21 OBTAINED FROM VISUAL SENSOR

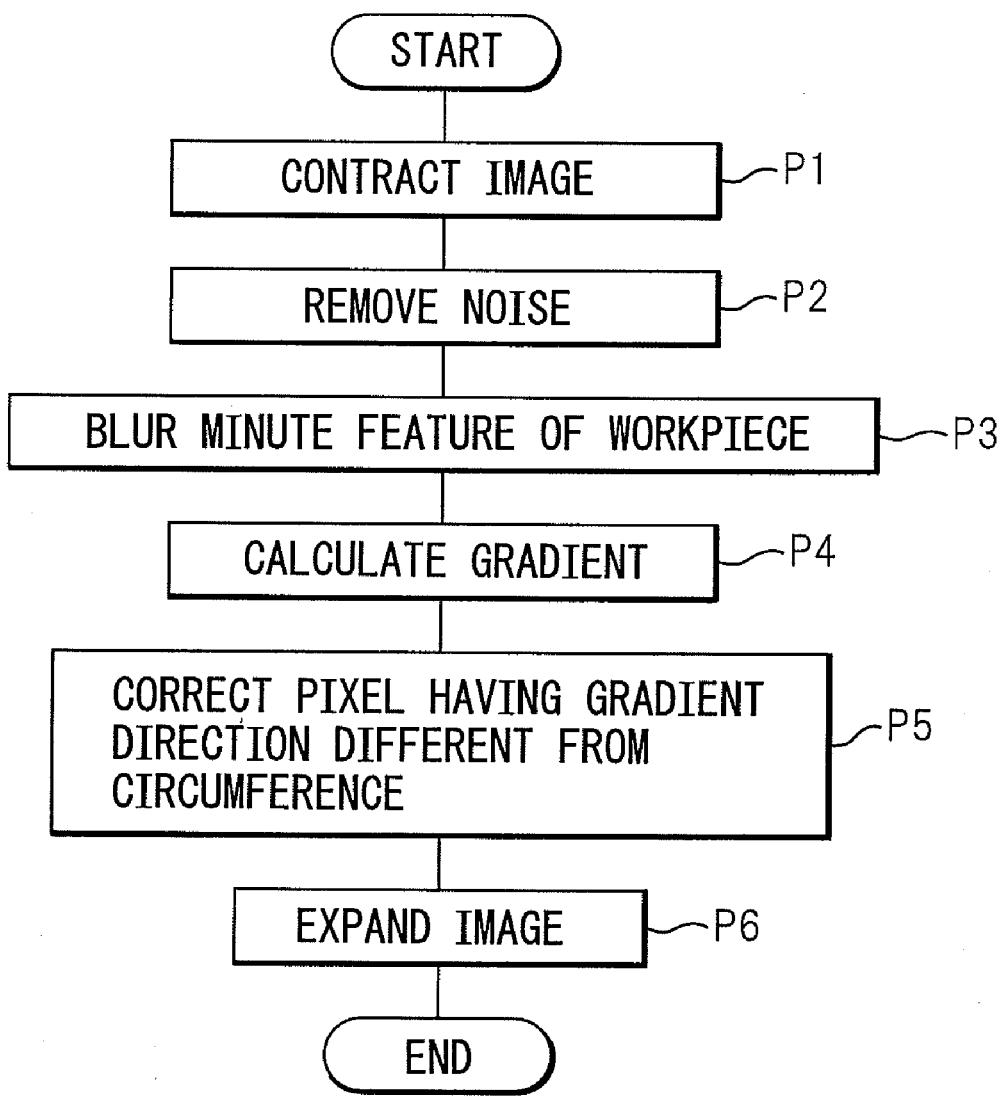

OBSERVATION OF REFLECTED
LIGHT FROM OBJECT SURFACE

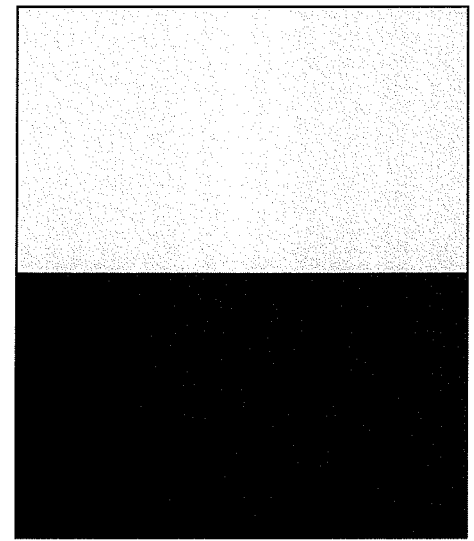
COLOR REPRESENTATION 19 OF GRADIENT DIRECTION
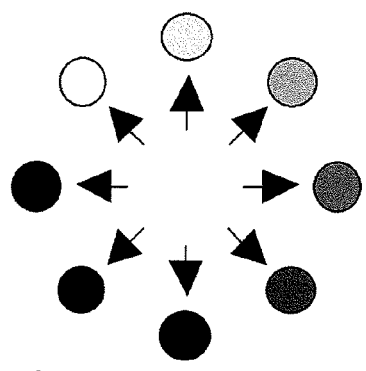
Fig.12a
CORRESPONDENCE TABLE 17 BETWEEN GRADIENT DIRECTION AND COLOR
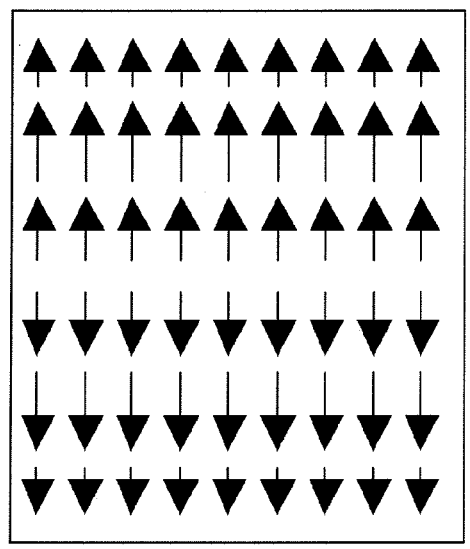
Fig.12b
VECTOR REPRESENTATION 18 OF GRADIENT

APPARATUS FOR PICKING UP OBJECTS

RELATED APPLICATIONS

The present application is based on, and claims priority from, Japanese Application Number 2007-091730, filed Mar. 30, 2007, the disclosure of which is hereby incorporated by reference herein in its entirety.

BACKGROUND OF THE INVENTION

1. Field of the Invention

The present invention relates to an apparatus for picking up objects, particularly, workpieces having curved shapes, using a robot.

2. Description of the Related Art

Recently, a plurality of workpieces arranged in a disorderly manner, or a plurality of workpieces randomly positioned in a basket or pallet, are picked up by an industrial robot. Picking up so-called polyhedral workpieces from a basket, each of the workpieces having a large number of plain portions whose contour and shape feature can be stably detected, has previously been disclosed (see: "Practical Bin Picking by the Intelligent Robot", Proc. of 36th ISR, TH311, 2005).

On the other hand, a workpiece with curved shapes has few detectable features, such as texture. Also, a workpiece with curved shapes has a problem in that its observed contour fluctuates depending upon illumination and other camera conditions. Therefore, it is difficult to detect workpieces with curved shapes, so that the use of robots to pick them up is not practical.

For example, Japanese Unexamined Patent Publication (Kokai) No. 2005-1022 discloses that a three-dimensional model for a workpiece with curved shapes is constructed to match the contour lines and textures of the workpiece.

Also, Japanese Patent No. 3252941 suggests a technique for recognizing a workpiece with curved shapes by an approach using eigenvectors.

Further, Japanese Unexamined Patent Publication (Kokai) No. 10-315167 discloses that workpiece are scanned and irradiated with a laser slit light in a mesh state so that the three-dimensional curved shape of the workpiece is recognized based on the reflected light. In this case, a three-dimensional model matching the object shape can be obtained without using contours and textures.

However, in the technique described in Japanese Unexamined Patent Publication (Kokai) No. 2005-1022, when a workpiece does not have a detectable contour or texture, such a workpiece cannot be detected.

Also, the technique described in Japanese Patent No. 3252941 assumes that a background can be completely separated from an object to be detected. As a result, the technique described in Japanese Patent No. 3252941 cannot respond to a state where a plurality of workpieces are superposed thereonto. Further, even in the technique described in Japanese Patent No. 3252941, in the same way as in Japanese Unexamined Patent Publication (Kokai) No. 2005-1022, since a texture or contour is required, it is difficult to precisely recognize a workpiece such as a simple cylinder.

Further, in the technique described in Japanese Unexamined Patent Publication No. 10-315167, complex and expensive equipment is required to obtain three-dimensional shape data. Additionally, since extensive calculating processing is usually required to calculate three-dimensional data, it is difficult to put the system described in Japanese Unexamined Patent Publication (Kokai) No. 10-315167 into practical use.

In view of the above-described circumstances, an object of the present invention is to provide an apparatus for picking up objects capable of detecting and picking up a workpiece with a curved shape whose texture is slight and whose contour is unclear, in a reasonably short period of time.

SUMMARY OF THE INVENTION

In order to achieve the above-mentioned object, according to a first aspect of the present invention, there is provided an apparatus for picking up objects including a robot for picking up an object, at least one part of the object having a curved shape, comprising: a storing means for storing a gray gradient distribution model of the object; a recognizing means for recognizing a gray image of the object; a gradient extracting means for extracting a gray gradient distribution from the gray image recognized by the recognizing means; an object detecting means for detecting a position or position posture of the object in the gray image in accordance with the gray gradient distribution extracted by the gradient extracting means and the gray gradient distribution model stored by the storing means; a detection information converting means for converting information of the position or position posture detected by the object detecting means into information of position or position posture in a coordinate system regarding the robot; and a robot moving means for moving the robot to the position or position posture converted by the detection information converting means to pick up the object.

In other words, according to the first aspect of the present invention, the position or position posture is determined by comparing the gray gradient distribution obtained from the gray image of the object such as a workpiece with the gray gradient distribution model. Therefore, even if the object has slight texture or a curved shape whose contour is unclear, the object can be detected and picked up promptly.

According to a second aspect of the present invention, as in the first aspect, the apparatus for picking up objects further comprises a designating means for designating edge information of the object in the gray image recognized by the recognizing means; and an edge extracting means for extracting the edge information designated by the designating means from the gray image, wherein the storing means stores an edge information model of the object, and wherein the object detecting means detects the position or position posture of the object in the gray image in accordance with gray gradient distribution extracted by gradient extracting means and the edge information extracted by the edge extracting means, and the gray gradient distribution model and the edge information model stored by the storing means.

In other words, according to the second aspect, the edge information is simultaneously used, so that the position or position posture of the object can be more precisely detected.

According to a third aspect of the present invention, there is provided an apparatus for picking up objects including a robot for picking up an object, at least one part of the object having a curved shape, comprising a storing means for storing a distance gradient distribution model of the object; a recognizing means for recognizing a distance image of the object; a gradient extracting means for extracting a distance gradient distribution from the distance image recognized by the recognizing means; an object detecting means for detecting a position or position posture of the object in the distance image in accordance with the distance gradient distribution extracted by the gradient extracting means and the distance gradient distribution model stored by the storing means; a detection information converting means for converting information of the position or position posture detected by the object detecting means into position information or position posture in a coordinate system regarding the robot; and a robot moving means for moving the robot to the position or position posture converted by the detection information converting means to pick up the object.

In other words, according to the third aspect of the present invention, the position or position posture is determined by comparing the distance gradient distribution obtained from the gray image of the object such as a workpiece with the distance gradient distribution model. Therefore, even the object has slight texture or unclear curved-shaped contour, the object can be detected and picked up promptly.

According to a fourth aspect of the present invention, as in the third aspect, the apparatus for picking up objects further comprises a designating means for designating edge information of the object in the distance image recognized by the recognizing means; and an edge extracting means for extracting the edge information designated by the designating means from the distance image, wherein the storing means stores an edge information model of the object, and wherein the object detecting means detects the position or position posture of the object in the distance image in accordance with the distance gradient distribution extracted by the gradient extracting means and the edge information extracted by the edge extracting means, and the distance gradient distribution model and the edge information model stored by the storing means.

In other words, according to the fourth aspect, the edge information is simultaneously used, so that the position or position posture of the object can be more precisely detected.

According to a fifth aspect of the present invention, as in the first or third aspect, the apparatus for picking up objects further comprises a position error accommodating means for accommodating a position error between a hand of the robot and the object when the robot is moved by the robot moving means.

In other words, in the fifth aspect, the position error is accommodated, so that the object can be more precisely grasped and picked up. As the position error accommodating means, a floating mechanism can be provided on the robot, particularly, on the hand thereof. Also, a servo control system for performing an articulation operation of the robot may be flexible against an external force.

According to a sixth aspect of the present invention, as in the first aspect, the recognizing means comprises a parallel light illuminator coaxial with recognizing means.

In other words, in the sixth aspect, the gray pattern in the gray image only depends upon the relative posture between the recognizing means and the object, thus obtaining a suitable gray image.

According to a seventh aspect of the present invention, as in the first aspect, the apparatus for picking up objects further comprises a display means for displaying the gray gradient distribution by changing the color for each gradient direction.

In other words, in the seventh aspect, the display of the gray gradient information can aid the operator for understanding the position or position posture of the object when the object is detected.

According to an eighth aspect of the present invention, as in the third aspect, the apparatus for picking up objects further comprises a display means for displaying the distance gradient distribution by changing the color for each gradient direction.

In other words, according to the eighth aspect, the display of the distance gradient information can aid the operator for understanding the position or position posture of the object when the object is detected.

BRIEF DESCRIPTION OF THE DRAWINGS

The object, feature and advantage and other objects, features and advantages of the present invention will be more clearly understood from the following description of the typical embodiments with reference to the accompanying drawings, wherein:

FIG. 2a is a functional block diagram of the workpiece picking up apparatus according to the present invention;

FIG. 2b is another functional block diagram of the workpiece picking up apparatus according to the present invention;

FIG. 6 is a diagram explaining a Log-Polar mapping pattern used at step T4 of FIG. 5;

FIG. 8 is a detailed flowchart explaining the gradient calculating step T2 of FIG. 5;

FIG. 12a is a diagram illustrating a correspondence table between gradient directions and colors;

FIG. 12b is a diagram illustrating a display method of the calculated gradient directions.

DETAILED DESCRIPTION

Figure 1:
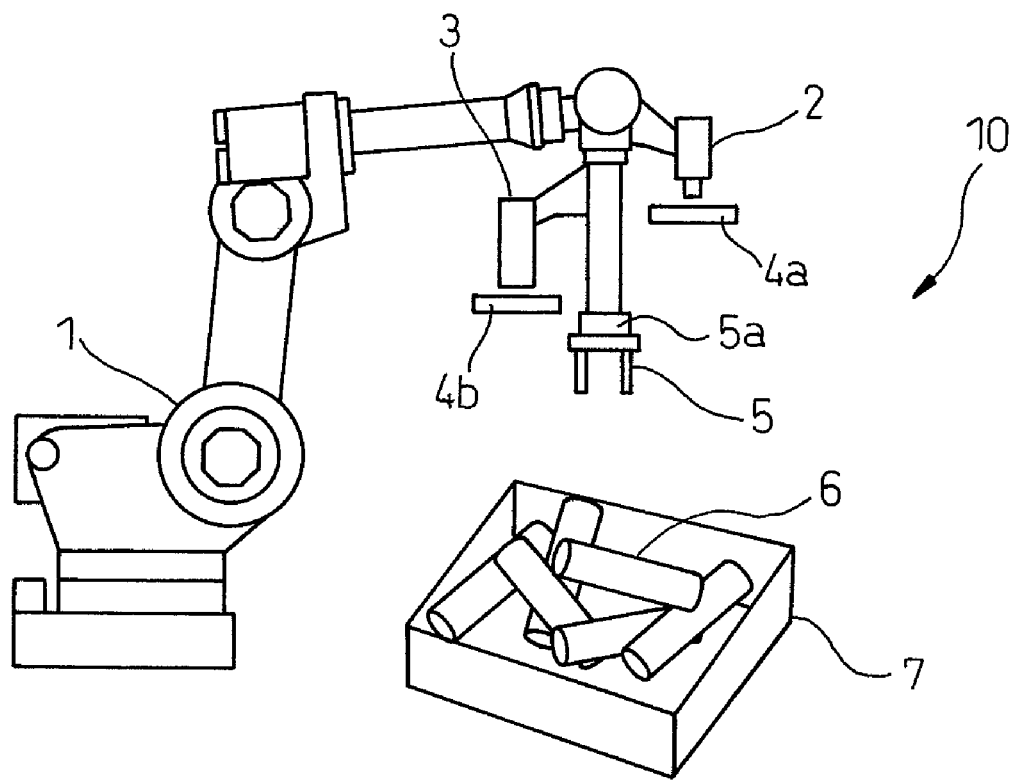
FIG. 1 is a diagram illustrating the entire workpiece picking up apparatus according to one embodiment of the present invention.

Hereinafter, the embodiments of the present invention will be explained with reference to the accompanying drawings. In the drawings, the same reference numerals are used for the same elements. For better understanding, the scale of the drawings have been appropriately modified.

FIG. 1 is a view illustrating the entire workpiece picking up apparatus according to one embodiment of the present invention.

A workpiece picking-up apparatus 10 of the present invention is constructed by a robot 1, a camera 2, a three-dimensional visual sensor 3, illuminators 4a and 4b, a hand 5 and a floating mechanism 5a, which will be explained below. The robot 1 as illustrated in FIG. 1 is a known robot manipulator (hereinafter, simply referred to as a robot). The robot 1 includes various kinds of mechanisms by which the hand 5 can reach positions where the hand 5 carries out an picking up operation.

The above-mentioned robot 1 is used to pick up a plurality of workpieces 6 having the same shape arranged on a pallet 7. The workpieces picked up by the workpiece picking up apparatus of the present invention have slight texture or a curved shape whose contour is unclear. In FIG. 1, workpieces 6 are cylindrical as representative ones.

As illustrated, camera 2 and three-dimensional visual sensor 3 are mounted in the proximity of a proximal end of hand 5 of robot 1 in order to detect the positions and postures of workpieces 6. Camera 2 is used to pick up a relatively large area to obtain gray images. In FIG. 1, camera 2 is mounted in the proximity of hand 5. Note that camera 5 can be fixed to a camera rest (not shown) above pallet 7.

The three-dimensional visual sensor 3 is constructed of a camera (not shown) having a field for intercepting a single workpiece 6 and a laser slit projector (not shown). The three-dimensional visual sensor 3 can measure a three-dimensional position of a portion projected by the laser slit projector. Further, the three-dimensional visual sensor 3 can measure the positions and postures of the workpieces 6 having a predetermined geometric shape such as plane-type or cylindrical-type workpieces 6.

Since such a three-dimensional visual sensor 3 is well known, its detailed description is omitted. Also, since a three-dimensional visual sensor formed by a plurality of two-dimensional visual sensors is well known, such three-dimensional visual sensors can be applied to the present invention. Additionally, the three-dimensional visual sensor 3 in combination with the operation of the robot 1 can obtain a distance image, which will be explained later.

In the present invention, there is no limit in the number of the robots 1 to be used; for example, a robot for detecting the positions and postures of the workpieces 6 and a robot for carrying out an picking up operation of the workpieces can be used. Further, as illustrated in FIG. 1, a system is constructed with a single robot that carries out the detection and picking up operation of the workpieces 6.

The camera 2 and the camera of the three-dimensional visual sensor 3 are similar to each other, and they can either be color cameras or monochromatic cameras. If they are color cameras, specific color information is extracted from picked-up images, and the same processing as in the monochromatic cameras is performed upon the specific color information.

The hand 5 is provided with a floating mechanism 5a for tracing or following an inclination of the workpiece 6. The floating mechanism 5a serves as a position error accommodating means for accommodating a position error between the hand 5 and the workpiece 6. Also, instead of the floating mechanism 5a provided at the hand 5, a servo control system for carrying out an articulation operation of the robot 1 can be constructed flexibly against an external force. In such a structure, when the hand 5 is subject to an external force, the robot 1 stops its operation or the robot 1 is operated to trace or follow the external force. Since such servo control is well known, its description is omitted.

Further, as illustrated, illuminators 4a and 4b are mounted on the camera 2 and the three-dimensional visual sensor 3, respectively. As will be explained later, the illuminators 4a and 4b are arranged on the optical axes, respectively, of the camera 2 and the three-dimensional visual sensor 3 in parallel with each other, so as to form a coaxial parallel illuminator.

FIG. 2a is a functional block diagram illustrating the workpiece picking up apparatus of FIG. 1. As illustrated in FIG. 2a, the robot 1 is provided with a robot moving means 1a such as servo motors for moving each part of the robot 1. As illustrated, the robot 1 is connected to a robot control unit 11. The robot control unit 11 is a digital computer which carries out various kinds of control of the robot 1.

As illustrated, the camera 2 and the three-dimensional visual sensor 3 are connected to an image processing unit 12 which is connected to the robot control unit 11. The operation of the robot 1 is carried out by a teaching control panel 13 connected to the robot control unit 11. Also, the camera 2 and the three-dimensional visual sensor 3 are set by a user interface (not shown) of the image processing unit 12. Additionally, the state of the robot 1 is displayed on the teaching control panel 13, and the state of the three-dimensional visual sensor 3 is displayed on a monitor 14. Further, a designating means 15 such as a keyboard, a mouse or the like is connected to the robot control unit 11.

Also, FIG. 2b is another functional block diagram of illustrating the workpiece picking up apparatus of FIG. 1. The image processing unit 12 is built in to the robot control unit 11. In FIG. 2b, the teaching operation of the robot 1 and the setting of the three-dimensional visual sensor 3 are both carried out by the teaching control panel 13. Additionally, the state of the robot 1 and the state of the three-dimensional visual sensor 3 can be displayed on the teaching control panel 13.

Further, in order to easily set the camera 2 and the three-dimensional visual sensor 3 and confirm the state thereof, an auxiliary input unit 16 and the monitor 14 can be used through a communication interface. Note the auxiliary input unit 16 and the monitor 14 can be removed during an automatic operation of the robot 1.

Figure 3:
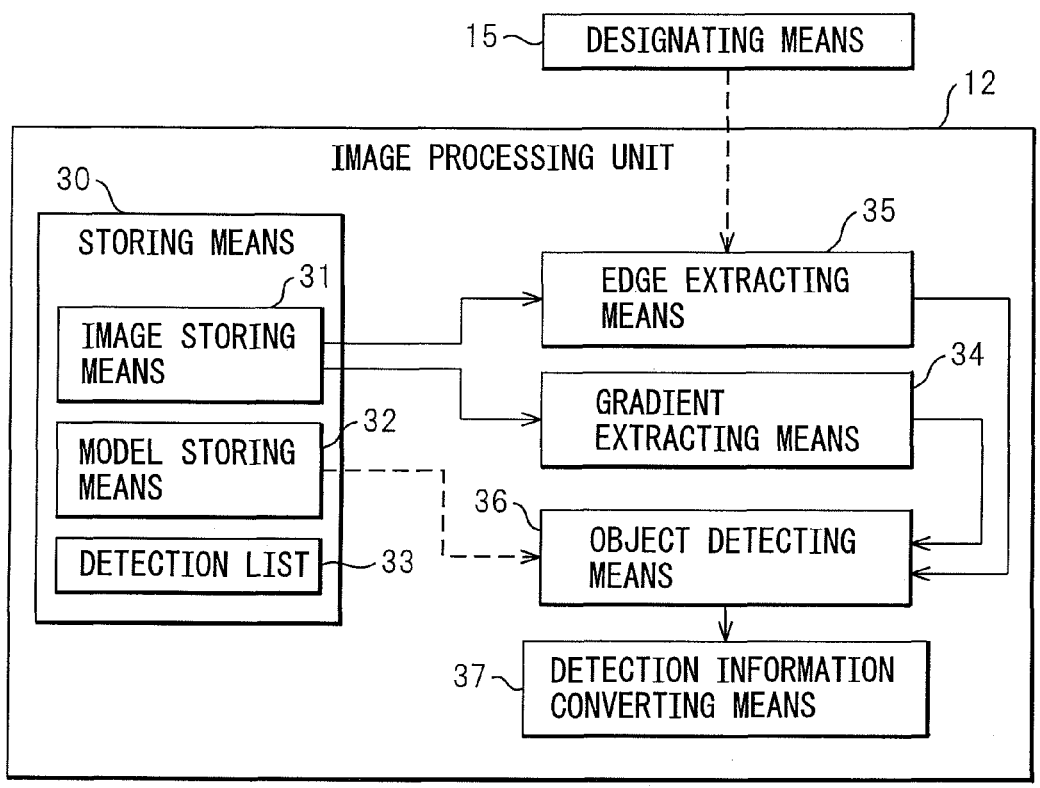
FIG. 3 is a detailed diagram of the image processing unit of FIGS. 2a and 2b.

FIG. 3 is a detailed diagram of the image processing unit 12 of FIGS. 2a and 2b. As illustrated in FIG. 3, the image processing unit 12 includes a storing means 30 such as a RAM provided with an image storing means 31, a model storing means 32 and a detection list 33. Further, as illustrated, the robot control unit 11 includes a gradient extracting means 34, an edge extracting means 35, an object detecting means 36 and a detection information converting means 37, which will be explained later.

The image storing means 31 in FIG. 3 can store images picked up by the camera 2 and the three-dimensional visual sensor 3. The model storing means 32 stores predetermined model information of the workpieces 6. The model information of the workpieces 6 includes a gray gradient distribution and a distance gradient distribution of the entire workpiece. Further, the model information of the workpieces 6 includes an edge information model showing texture of the workpieces 6 or portions where the contours of the workpieces 6 are clearly indicated.

Figure 4:
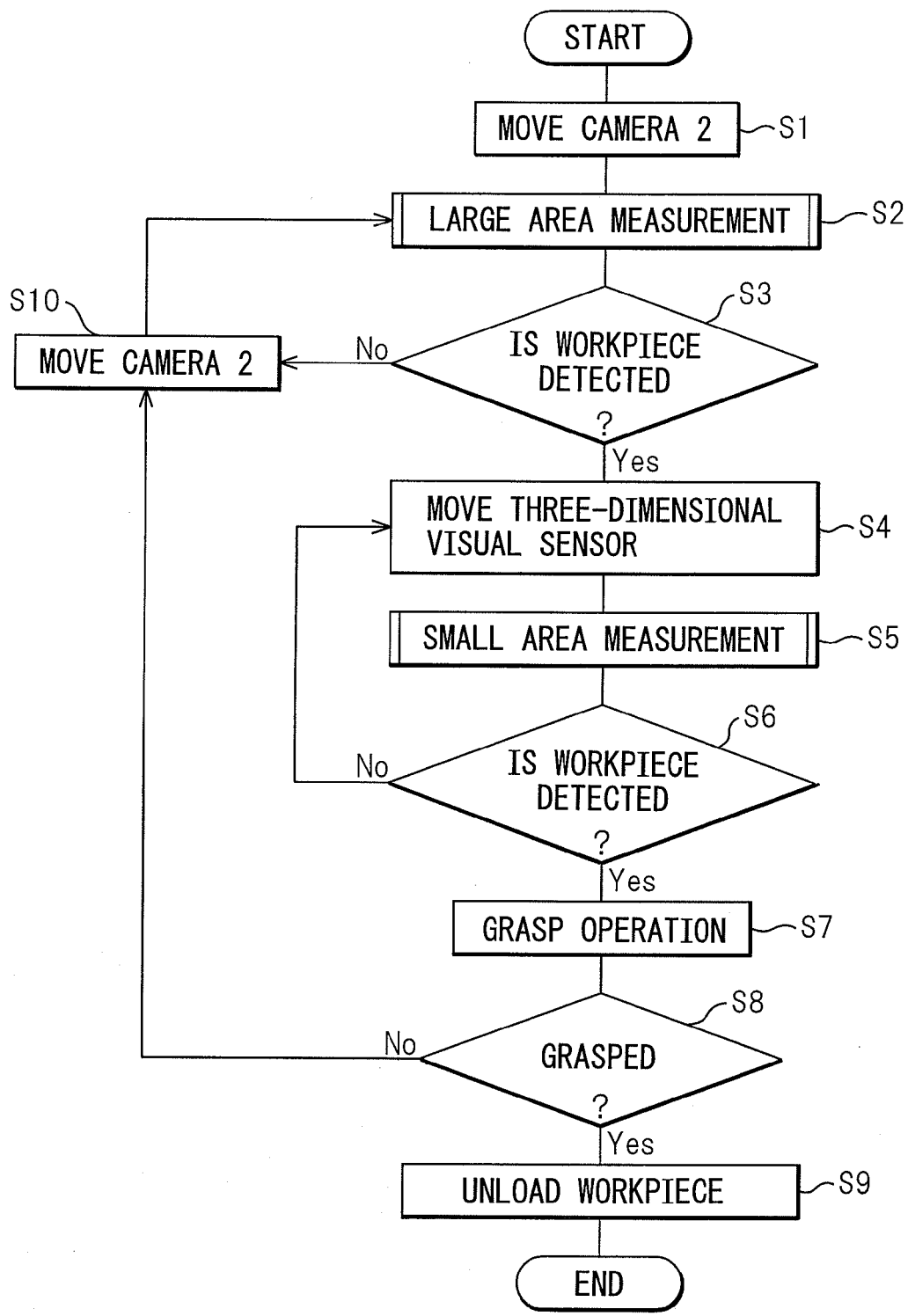
FIG. 4 is a flowchart showing a sequence for picking up workpieces by the workpiece picking up apparatus of FIG. 1.

FIG. 4 is a flowchart showing a sequence for picking up workpieces by the workpiece picking up apparatus of FIG. 1. As illustrated in FIG. 4, first, the camera 2 is moved above the pallet 7 by the robot moving means 1a of the robot 1 (step S1). Then, a large area measurement which will be explained later, is carried out to roughly grasp positions and postures of the workpieces 6 (step S2) by the camera 2.

Then, it is determined whether or not at least one of the workpiece 6 is detected within an image picked up by the large area measurement (step S3). This detection of the workpiece 6 is carried out by the object detecting means 36 of the robot control unit 11, as will be explained later. When it is determined at step S3 that none of the works 6 are detected, the camera 2 is again moved above the pallet 7 (step S10) to carry out a large area measurement.

On the other hand, if it is determined at step S3 that at least one of the workpieces is detected, an uppermost one of the workpieces 6 is selected. Note that such an uppermost one of the workpiece 6 is the largest one of the detected workpieces in the picked-up image. Then, the three-dimensional visual sensor 3 is moved by the robot moving means 1a of the robot 1 to the proximity of the selected workpiece 6 (step S4).

Then, the selected workpiece 6 is irradiated with laser slit light from the laser slit projector of the three-dimensional visual sensor 3 to carry out a small area measurement (step S5). Thereafter, it is determined whether or not the selected workpiece 6 is detected by the small area measurement (step S6). When it is determined that the selected workpiece 6 is not detected, the process returns to step S5, thus repeating the processes at steps S4 and S5 until the selected workpiece 6 is detected.

When it is determined at step S6 that the selected workpiece 6 is detected, the selected workpiece 6 is grasped by the hand 5 (step S7). Then, it is determined whether or not the grasping operation by the hand 5 has succeeded (step S8) on the basis of the opening degree of the hand 5. When it is determined at step S8 that the selected workpiece 6 is suitably grasped, the process proceeds to step S9 wherein the selected workpiece 6 is picked up from the pallet 7, thus completing the flowchart of FIG. 4. On the other hand, when it is determined that the selected workpiece 6 is not suitably grasped, the camera 2 is again moved above the pallet 7 (step S10) to carry out a large area measurement.

Figure 5:
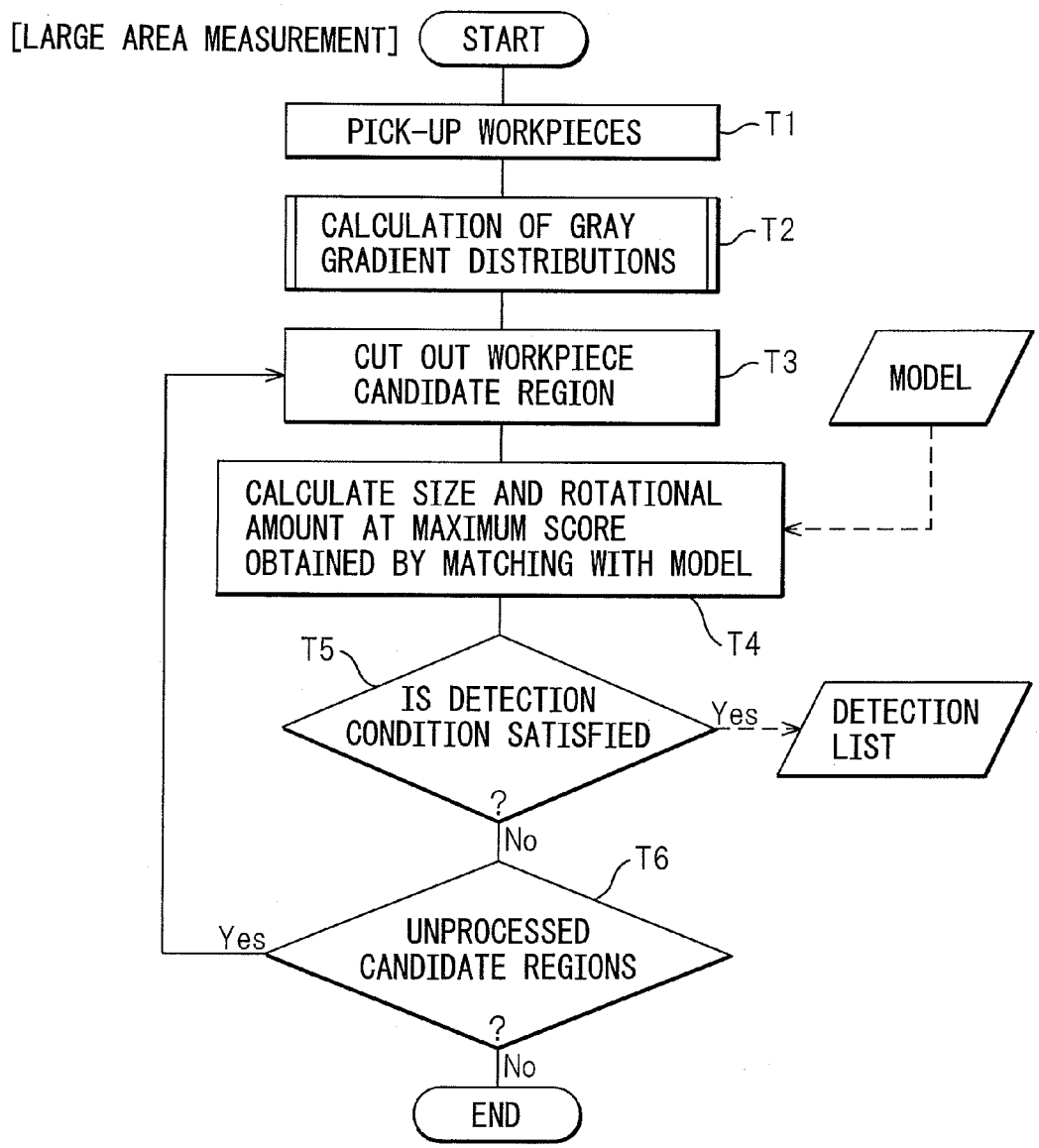
FIG. 5 is a detailed flowchart showing an example of the large area measurement step S2 of FIG. 4.

FIG. 5 is a detailed flowchart showing an example of the large area measurement step S2 of FIG. 4. As illustrated in FIG. 5, first, the entire pallet 7 is picked up by the camera 2 from its upper side (step T1). The picked-up image is stored in the image storing means 31, and then, gray gradient distributions in a range, in which workpieces are detected, are calculated within the picked-up image (step T2). The calculation of the gray gradient distributions is carried out by the gradient extracting means 34 which will be explained later.

Then, a workpiece candidate region to be compared with a model is cut out from the gray gradient distributions extracted by the gradient extracting means 34 (step T3). Thereafter, at step T4, a model candidate region corresponding to the cut-out workpiece candidate region is taken out from the model storing means 32. Then, the gray gradient distribution of the workpiece candidate region is compared with the gray gradient distribution of the model candidate region by the object detecting means 36 to carry out a matching therebetween. Then, the size and rotational amount of the cut-out workpiece candidate region is calculated when the score (matching degree) is maximum (step T4).

Then, at step T5, it is determined whether or not the obtained matching degree is larger than a threshold value. When the obtained matching degree is larger than the threshold value, the detecting condition is satisfied. If so, the above-mentioned size and the rotational amount are stored in the detection list 33 of the storing means 30. Further, the size and rotational amount are converted by the detection information converting means 37 into the coordinate system of the robot 1, and the converted result is also stored in the detection list 33.

Note that calibration data for relating the position and posture of the workpiece 6 in the image of the camera 2 to those of the workpiece 6 in the coordinate system of the robot 1 is obtained in advance, in order to carry out a converting operation in the coordinate system of the robot 1 by the detection information converting means 37. The converting operation described above is carried out on the basis of the calibration data. Since this converting operation is well known, its detailed description is omitted.

After that, it is determined whether or not all of the workpiece candidate regions have been searched (step T6). When there are unprocessed workpiece candidate regions, the process returns to step T3 as illustrated, thus repeating the above-mentioned processing.

Incidentally, a Log-Polar mapping pattern is used at step T4 which determines the size and rotational amount. FIG. 6 is a diagram explaining the Log-Polar mapping pattern. As illustrated in FIG. 6, a Log-Polar mapping pattern is obtained by converting a gray pattern of a Euclid coordinate representation into a polar coordinate representation thereof where the abscissa designates η (angle) and the ordinate designates log λ.

Even when gray gradient patterns are expanded or contracted at an actually-estimated size from 50% to 200%, their Log-Polar mapping patterns are almost the same. Therefore, in the present invention, Log-Polar mapping patterns are generated from a model candidate region of the model storing means 32 and from the workpiece candidate region from the image of the camera 2. Then, the Log-Polar mapping patterns are moved parallel within the polar coordinate space to search for the positions where the Log-Polar mapping patterns almost coincide with each other. While the Log-Polar mapping patterns almost coincide with each other, the rotational amount is determined in accordance with values of the position at the abscissa and the size is determined in accordance with values of the position at the ordinate. Thus, since the present invention does not require a rotational processing of a workpiece model and similar conversion processing, a high speed processing can be carried out as compared with the prior art.

In a Log-Polar mapping pattern, accuracy may be insufficient due to the matching in the Log-scale regarding the size. Thus, the following processing is preferably added after step T4 of FIG. 5, if possible.

In other words, when a portion having a clear contour or texture is present in the workpieces 6 within the picked-up image, the operator indicates the portion including this contour or the texture as edge information on the image by using the designating means 15. Then, the edge extracting means 35 of the robot control unit 11 extracts the indicated edge information from the image. Then, as a pattern matching for determining only the size, the edge information model from the model storing means 32 is compared by the object detecting means 36 with the indicated edge information to carry out a matching therebetween.

Since the above-mentioned processing is a matching carried out in a state where the position and the rotational amount are already determined, the processing time would not be remarkably increased, i.e., in the present invention, by using the edge information together, the positions and posture of the workpieces 6 can be more precisely detected without remarkably increasing the processing time.

Figure 7A:
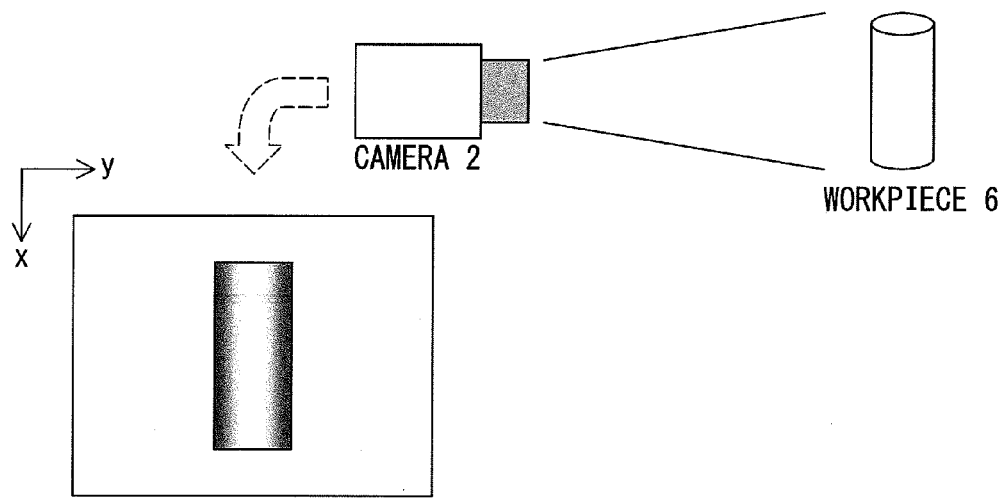
FIG. 7a is a diagram illustrating an example of the image picked up by the camera of FIG. 1.
Figure 7B:
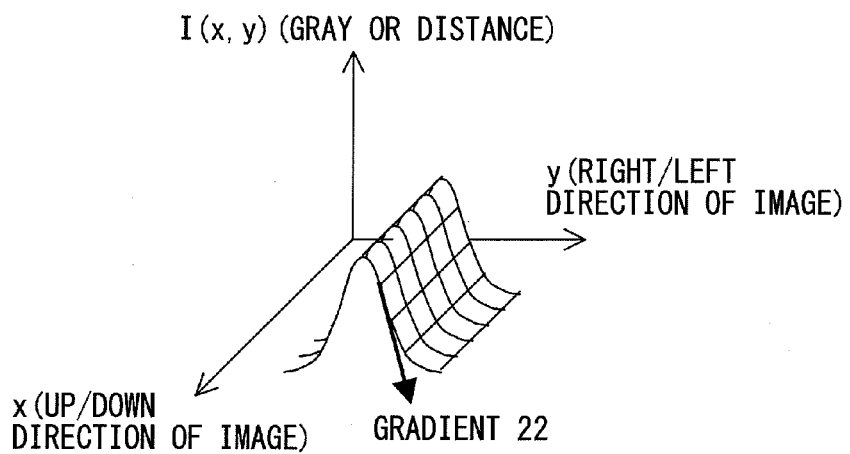
FIG. 7b is a diagram explaining the gradient at step T2 of FIG. 5.

FIG. 7*a* is a diagram showing an image picked up by the camera 2, and FIG. 7*b* is a diagram explaining the gradient at step T2 of FIG. 5. Further, FIG. 8 is a flowchart showing a method for calculating the gradient at step T2 of FIG. 5. Hereinafter, the gradient calculating method at step T2 is explained with reference to these figures.

In the example as illustrated in FIG. 7*a*, the image 21 obtained by the camera 2 which picks up the workpiece 6 is a gray image. Each pixel element in the image 21 shows brightness. As illustrated, the up/down direction of the image 21 is defined by x direction and the right/left direction of the image 21 is defined by y direction. If an element value of a pixel (x, y) in the image 21 is represented by I(x, y), the gradient of the image is represented by following expression (1).

$$\left( \frac{\partial}{\partial x} I(x, y), \frac{\partial}{\partial y} I(x, y) \right) = (\Delta I \cos \lambda, \Delta I \sin \lambda) \quad (1)$$

In the expression (1), ΔI is a strength of the gradient, and λ is a direction of the gradient. FIG. 7*b* shows a relationship between the strength ΔI and the direction λ.

As illustrated by the flowchart of FIG. 8, the picked-up image is contracted, and then, is subject to a filtering operation. Thereafter, the image is expanded. Thus, the equivalent effect as in a case where a large filter is used can be obtained at less cost.

In other words, in the flowchart of FIG. 8, first, the image is contracted (step P1), and spot-like noise which may cause fluctuation of the gradient is removed from the contracted image (step P2). Then, the image is blurred to reduce the effect caused by the small difference between the workpieces 6 (step P3). Thereafter, a gradient 22 of the image is calculated by using a differential-type spatial filter (step P4). Then, on the assumption that the calculated gradient 22 is basically continuous, the gradient direction of a pixel different from the circumference pixels is corrected (step P5). Finally, the image is expanded to the original size (step P6), thus completing the flowchart of FIG. 8.

The above-described embodiment relates to the processing of a gray image obtained by the camera 2; however, the same processing can be applied to a distance image obtained by the three-dimensional visual sensor 3 so that the distance gradient of the distance image can be obtained by the gradient extracting means 34. While a value at each pixel of a gray image represents brightness, a value at each pixel of a distance image represents a distance from the three-dimensional visual sensor 3 or information relating to the distance. For example, the distance from the three-dimensional visual sensor 3 may be a Z-coordinate value in the coordinate system of the robot. When a distance image is used, a distance gradient distribution is compared with a distance gradient distribution model in the model storing means 32. Also, when the camera 2 is a color camera, a gradient can be calculated by the same technique by extracting a specific color component from a picked-up image.

Figure 9:
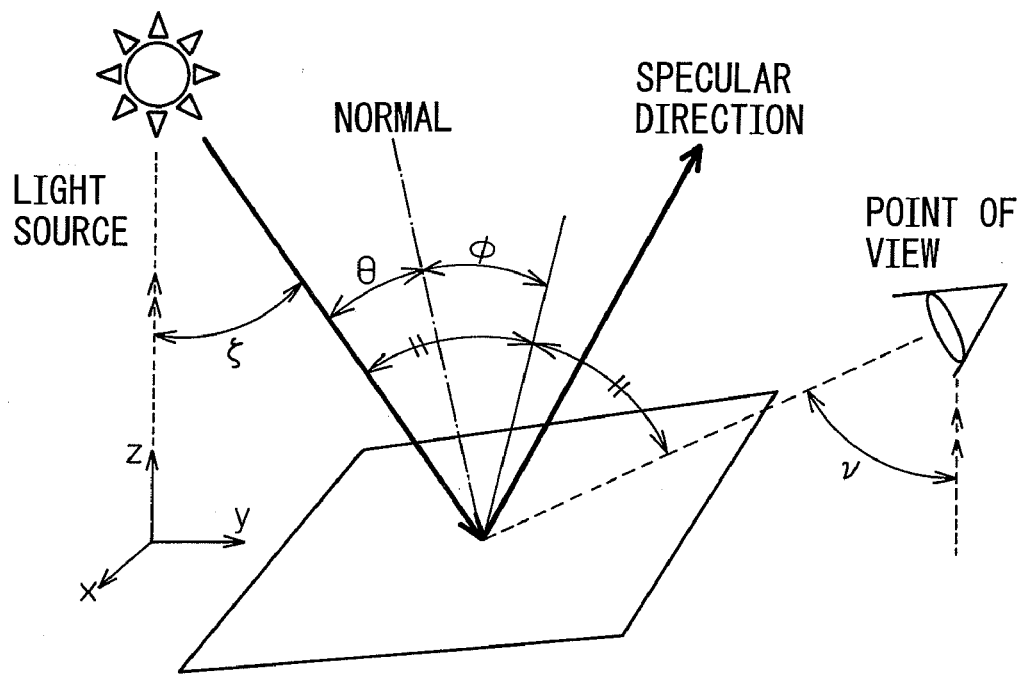
FIG. 9 is a diagram explaining the light strength.

Next, the arrangement of the illuminators 4a and 4b mounted on the optical axes as a coaxial parallel illuminator of the camera 2 and the three-dimensional visual sensor 3, respectively, is explained below. FIG. 9 is a diagram explaining the light strength. As illustrated in FIG. 9, the strength of a light reflected from a point (observed point) on an object surface into a field of view is represented by the following expression (2).

$$I_s = K_d \cos\theta + K_s \frac{e^{-\alpha\varphi^2}}{\cos\theta} \quad (2)$$

In the expression (2), the first term of the right member is a diffused reflection component representing a omnidirectionally and uniformly diffused light, thereby recognizing a color of an object. Here, $K_d$ is a diffused reflection coefficient, and θ is an angle between the incident angle of light and the normal of a tangent plane at the above-mentioned observed point.

The second term of the right member in the expression (2) is a mirror reflection component whose strength greatly depends upon the shape of the object, the position and strength of a light source, and the position of a point of view (camera). Here, $K_s$ is a mirror reflection coefficient, α is a coefficient showing a spread of a mirror reflected light from the observed point, depending upon the surface roughness of a workpiece, and φ is an angle between a bisector of an angle between the incident angle of a light and a line of view from a point of view, and the normal at a tangent plane.

Figure 10:
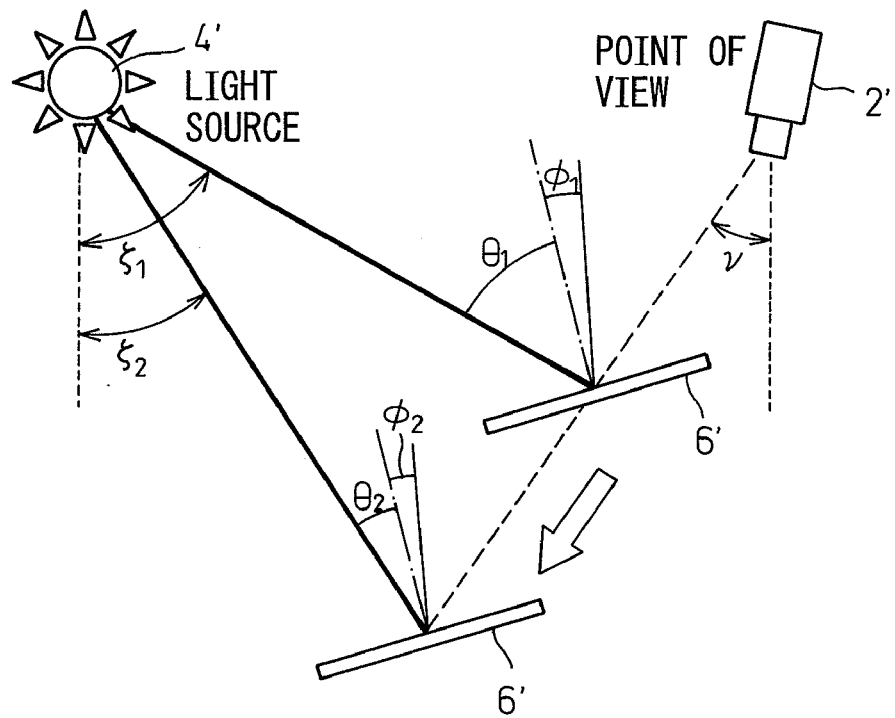
FIG. 10 is a diagram illustrating a case where an optical source is not arranged as a coaxial parallel illuminator for the workpieces.

As illustrated in FIG. 10, assuming that a camera 2' for picking up a workpiece 6' and a light source 4' are located at different positions. In this case, also assuming that the angle θ is θ1, and the angle φ is φ1. While the workpiece 6' maintains its predetermined posture with respect to the camera 2', the workpiece 6' and the camera 2' are moved relatively on the line of view along an arrow, so that the angle θ is changed from θ1 to θ2 and the angle φ is changed from φ1 to φ2. Therefore, as understood from the expression (2), different reflection strengths are observed at the same observed point on the workpiece 6'.

This means that the gray pattern of the workpiece 6' is changed depending upon the distance (hereinafter, referred to as a stand-off) between the camera 2' and the workpiece 6' and the relative position between the light source 4' and the workpiece 6' which relative position cannot be generally controlled. In this case, a model for detecting workpieces which is prepared in advance in accordance with a gray pattern cannot be applied uniformly to an arbitrary workpiece.

Figure 11:
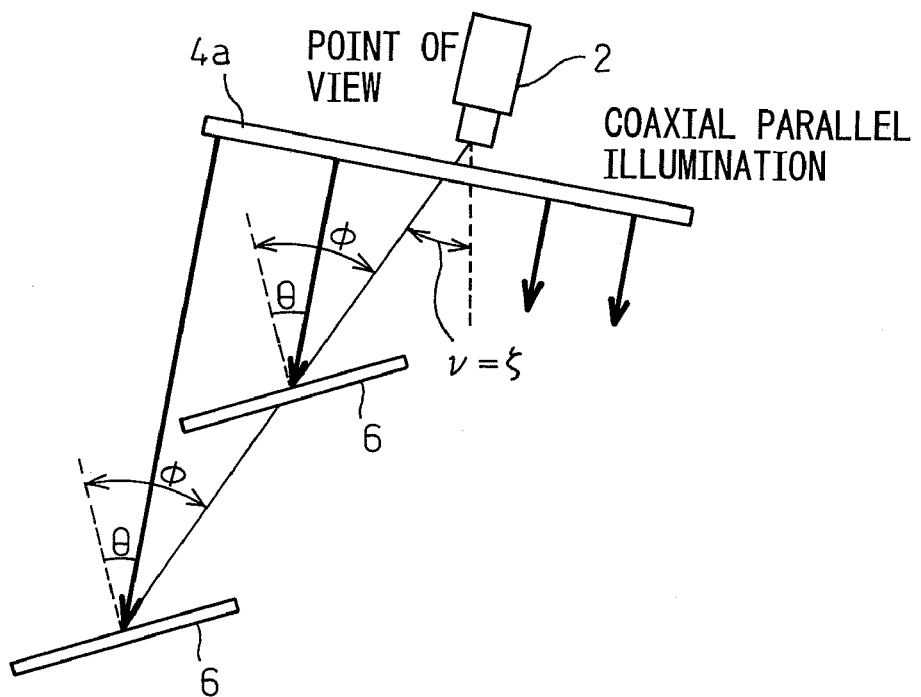
FIG. 11 is a diagram explaining the coaxial parallel illuminator.

Therefore, in the present invention, as illustrated in FIG. 11, the illuminator 4a is mounted in parallel with the optical axis of the camera 2. In this case, even when the stand-off is changed, the angle θ and the angle φ are not changed. Further, even when the relative position between the illuminator 4a and the workpiece 6 is changed, at least the angle θ is not changed. In addition, when the stand-off is sufficiently large, the angle φ is not also changed (φ≅0). In other words, in the present invention, the coaxial parallel illumination makes gray patterns depend only upon the relative posture between the camera 2 and the workpiece 6, thus obtaining a suitable gray image. Similarly, the illuminator 4b is preferably mounted on the three-dimensional visual sensor 3 as a coaxial parallel illumination.

FIG. 12a is a diagram illustrating a correspondence table between the gradient directions and colors, and FIG. 12b is a diagram explaining a method for displaying calculated gradient directions. If all of the calculated gradients are displayed by vector representation using arrows, the adjacent arrows may be superposed onto each other, so that it is very difficult to recognize displayed images. Therefore, it is necessary to display gradient information while being thinned out at every several pixel.

Therefore, in the present invention, the correspondence table between the gradient directions and colors as illustrated in FIG. 12a is prepared in advance and stored in the storing means 30. Then, as illustrated in FIG. 12b, one color corresponding to the gradient at each pixel in an image is selected and displayed. Thus, the gradient information of all the pixels within the image can be displayed on a single display screen.

Figure 13:
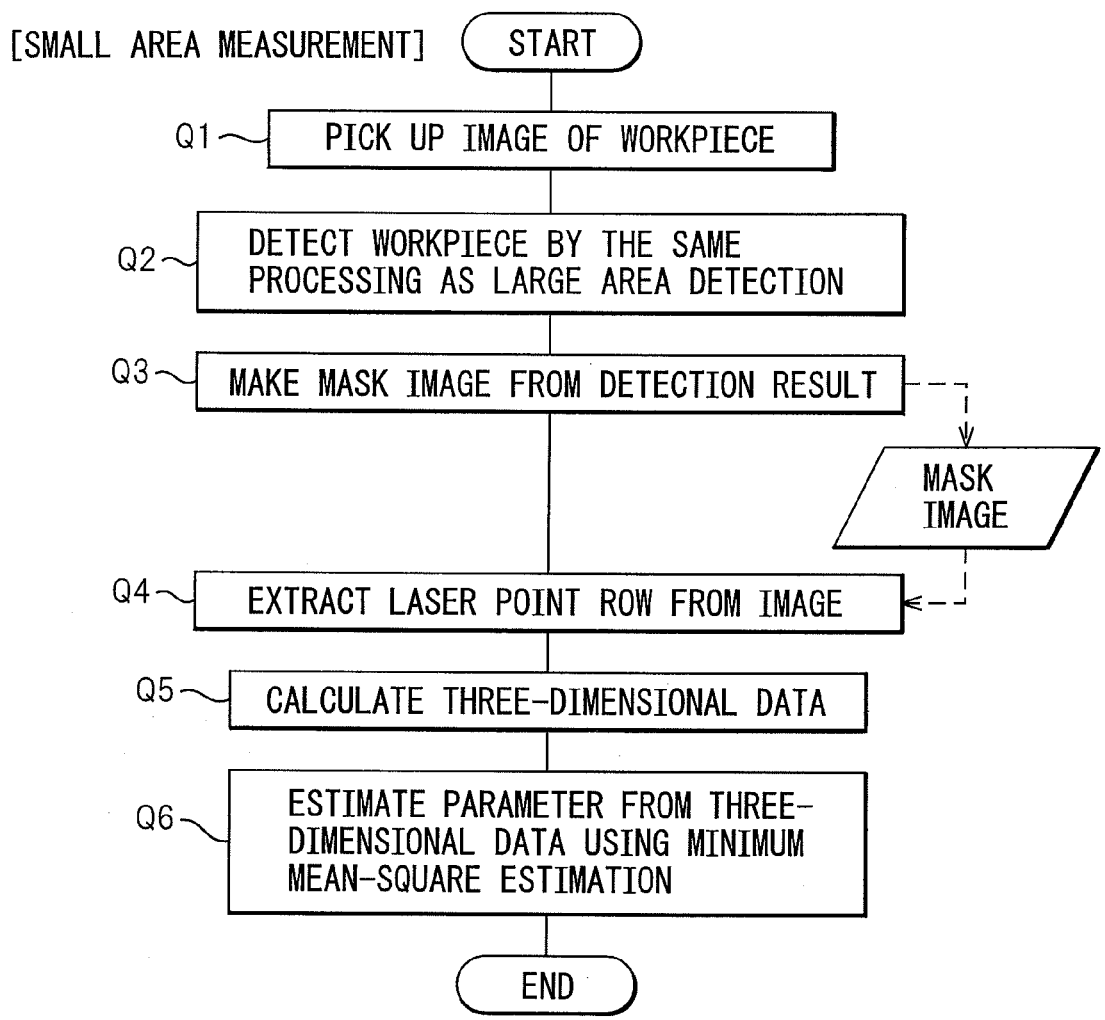
FIG. 13 is a flowchart illustrating an example of the small area measurement step S5 of FIG. 4.

FIG. 13 is a detailed flowchart illustrating an example of the small area measurement at step S5 of FIG. 4. As illustrated in FIG. 13, a gray image of the workpiece 6 and an image projected a laser slit light on the workpiece 6 are obtained by the three-dimensional visual sensor 3 (step Q1). Then, the gray image of the workpiece 6 is subject to the same processing as in the large area processing, to determine the position and rotational amount of the cylindrical workpiece 6 on the image (step Q2).

Then, a mask image for extracting only the laser slit light projected on the surface of the workpiece 6 is made in accordance with the image projected by the laser slit light and the position and rotational amount of the cylindrical workpiece 6 (step Q3). Then, the laser slit light is extracted by the mask image to obtain a laser point row (step Q4), and a three-dimensional position data at each brightness point of the laser slit light is calculated (step Q5).

When the workpiece 6 is cylindrical, parameters representing the position and posture of a cylinder are determined by performing a minimum mean-square method upon the three-dimensional data. Then, the position and posture of the workpiece 6 at the coordinate system of the robot 1 are determined by using the calibration data of the three-dimensional visual sensor 3 based upon the known method (step Q6).

Note that, when the workpiece 6 has a freely-curved surface, i.e., no predetermined parameters for a cylinder, for example, only a mean value of a height of the workpiece 6 is simply calculated from the three-dimensional position data at step Q6. Then, when the workpiece 6 is picked up at step S9 of FIG. 4, the gradient error and position error of the workpiece 6 can be accommodated by the floating mechanism 5a of the hand 5. Thus, the workpiece 6 can be accurately grasped and picked up.

In the above-described embodiment, the model storing means 32 stores the model information such as the gray gradient distributions of the workpieces 6. Such model information can be obtained by performing the processing as in FIG. 8 upon an image of one of the workpieces 6 picked up by the camera 2 or the like prior to the picking up operation of the workpiece 6. Also, the model information of the model storing means 32 can be obtained from computer aided design (CAD) data of the workpieces 6.

Although the present invention has been described in connection with the typical embodiments, it will appreciated by those skilled in the art that the embodiments may be modified, omitted and added in addition to the above-mentioned modification, without departing from the scope of the present invention.

The invention claimed is:

1. An apparatus for picking up objects including a robot for picking up an object, at least one part of said object having a curved shape, comprising:
a storing arrangement for storing a gray gradient distribution model of said object;
a recognizing arrangement for recognizing a gray image of said object;
a gradient extracting arrangement for extracting a gray gradient distribution from said gray image recognized by said recognizing arrangement;
an object detecting arrangement for detecting a position or position posture of said object in said gray image in accordance with said gray gradient distribution extracted by said gradient extracting arrangement and said gray gradient distribution model stored by said storing arrangement;
a detection information converting arrangement for converting information of said position or position posture detected by said object detecting arrangement into information of position or position posture in a coordinate system regarding said robot; and
a robot moving arrangement for moving said robot to the position or position posture converted by said detection information converting arrangement to pick up said object, the apparatus for picking up objects further comprising a display arrangement for displaying said gray gradient distribution by changing the color for each gradient direction.

2. The apparatus for picking up objects as set forth in claim 1, further comprising:
a designating arrangement for designating edge information of said object in said gray image recognized by said recognizing arrangement; and
an edge extracting arrangement for extracting said edge information designated by said designating arrangement from said gray image,
wherein said storing arrangement stores an edge information model of said object, and
wherein said object detecting arrangement detects the position or position posture of said object in said gray image in accordance with said gray gradient distribution extracted by said gradient extracting arrangement and said edge information extracted by edge extracting arrangement, and said gray gradient distribution model and said edge information model stored by said storing arrangement.

3. The apparatus for picking up objects as set forth in claim 1, further comprises a position error accommodating arrangement for accommodating a position error between a hand of said robot and said object when said robot is moved by said robot moving arrangement.

4. The apparatus for picking up objects as set forth in claim 1, wherein said recognizing arrangement comprises a parallel light illuminator coaxial with said recognizing arrangement.

5. An apparatus for picking up objects including a robot for picking up an object, at least one part of said object having a curved shape, comprising:
a storing arrangement for storing a distance gradient distribution model of said object;
a recognizing arrangement for recognizing a distance image of said object;
a gradient extracting arrangement for extracting a distance gradient distribution from said distance image recognized by said recognizing arrangement;
an object detecting arrangement for detecting a position or position posture of said object in said distance image in accordance with said distance gradient distribution extracted by said gradient extracting arrangement and said distance gradient distribution model stored by said storing arrangement;
a detection information converting arrangement for converting information of said position or position posture detected by said object detecting arrangement into information of position or position posture in a coordinate system regarding said robot; and
a robot moving arrangement for moving said robot to the position or position posture converted by said detection information converting arrangement to pick up said object, the apparatus for picking up objects further comprising a display arrangement for displaying said distance gradient distribution by changing the color for each gradient direction.

6. The apparatus for picking up objects as set forth in claim 5, further comprising:
a designating arrangement for designating edge information of said object in said distance image recognized by said recognizing arrangement; and
an edge extracting arrangement for extracting said edge information designated by said designating arrangement from said distance image,
wherein said storing arrangement stores an edge information model of said object, and
wherein said object detecting arrangement detects the position or position posture of said object in said distance image in accordance with said distance gradient distribution extracted by said gradient extracting arrangement and said edge information extracted by said edge extracting arrangement, and said distance gradient distribution model and said edge information model stored by said storing arrangement.

7. The apparatus for picking up objects as set forth in claim 5, further comprises a position error accommodating arrangement for accommodating a position error between a hand of said robot and said object when said robot is moved by said robot moving arrangement.

* * * * *